July 12, 1960 J. C. WALSH ET AL 2,944,479
VACUUM-STEAM PROCESSOR
Filed Oct. 25, 1956 6 Sheets-Sheet 4
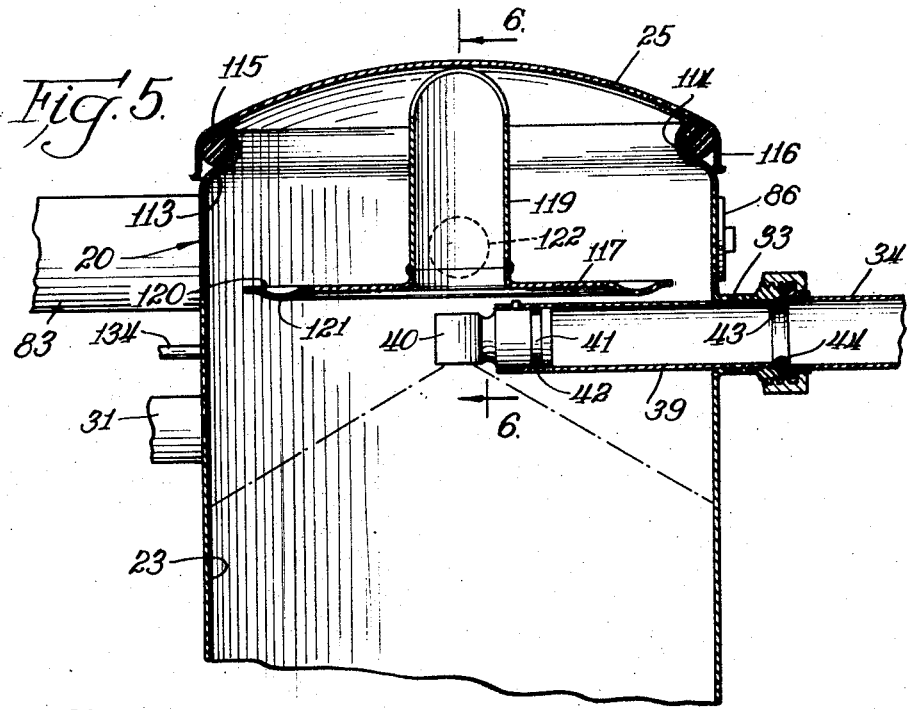
Fig. 5.
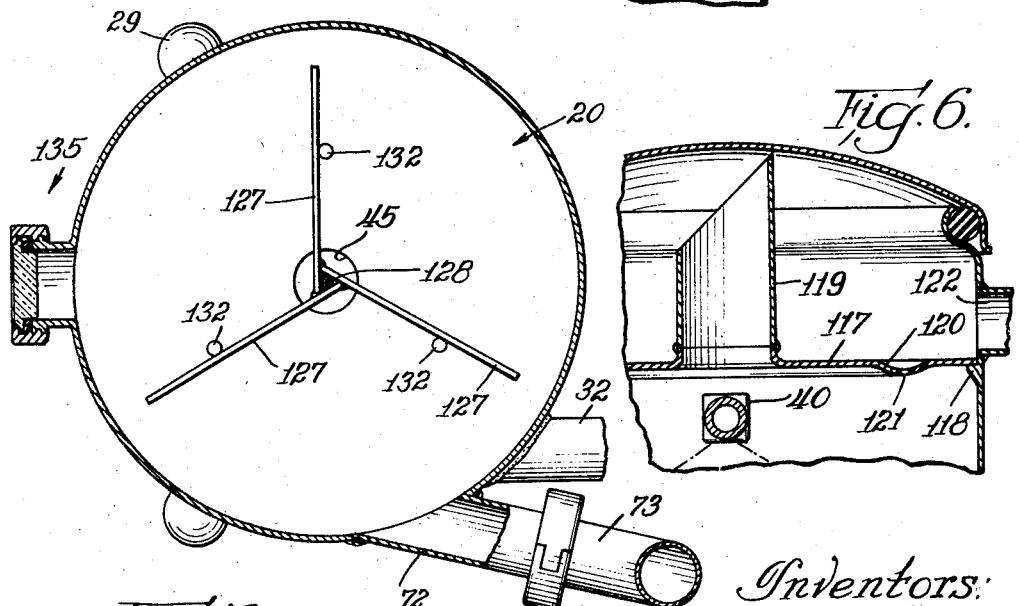
Fig. 6.
Fig. 7.
Inventors:
John C. Walsh and
William M. Haselton
By E. Manning Giles
Att'y.

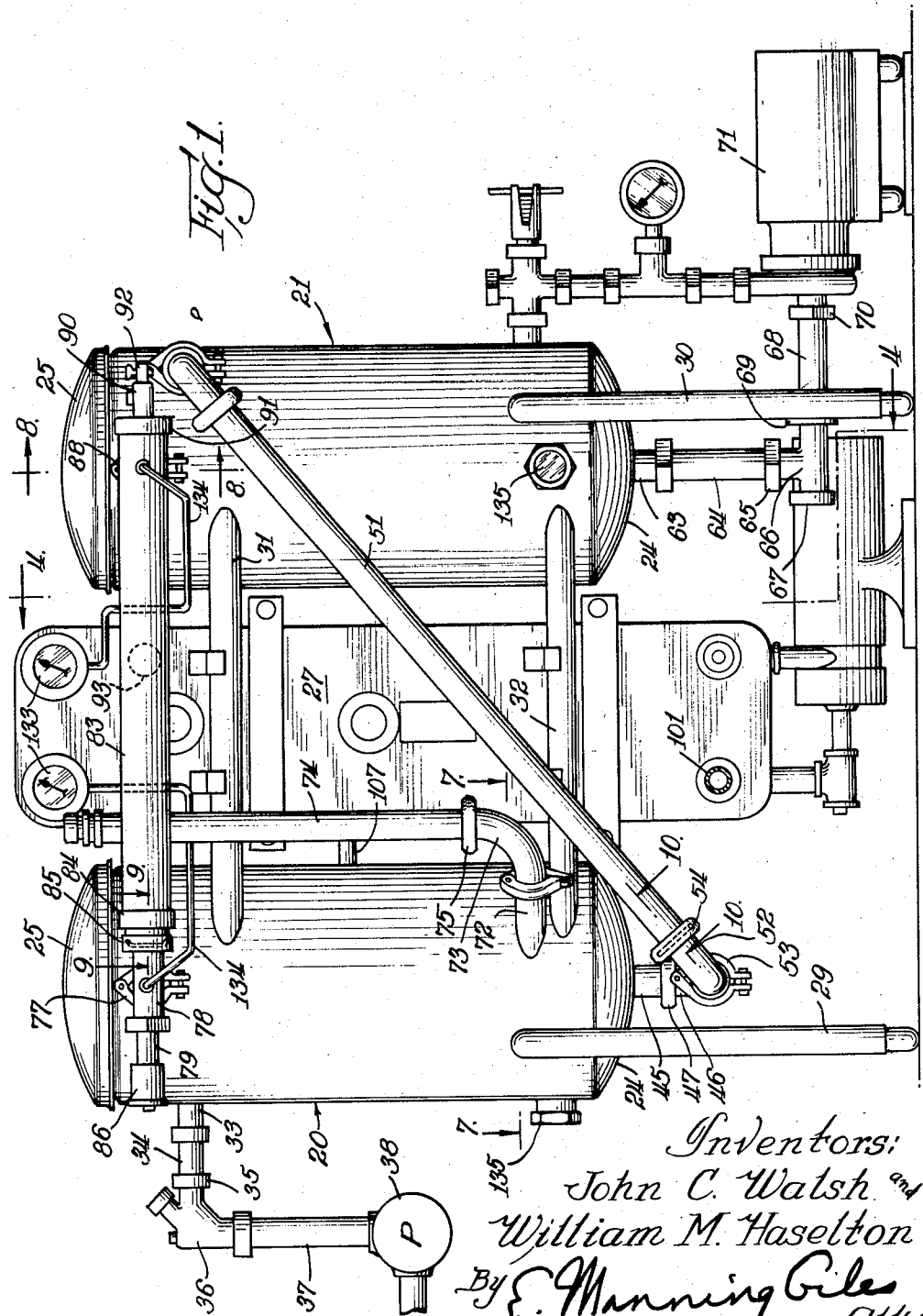

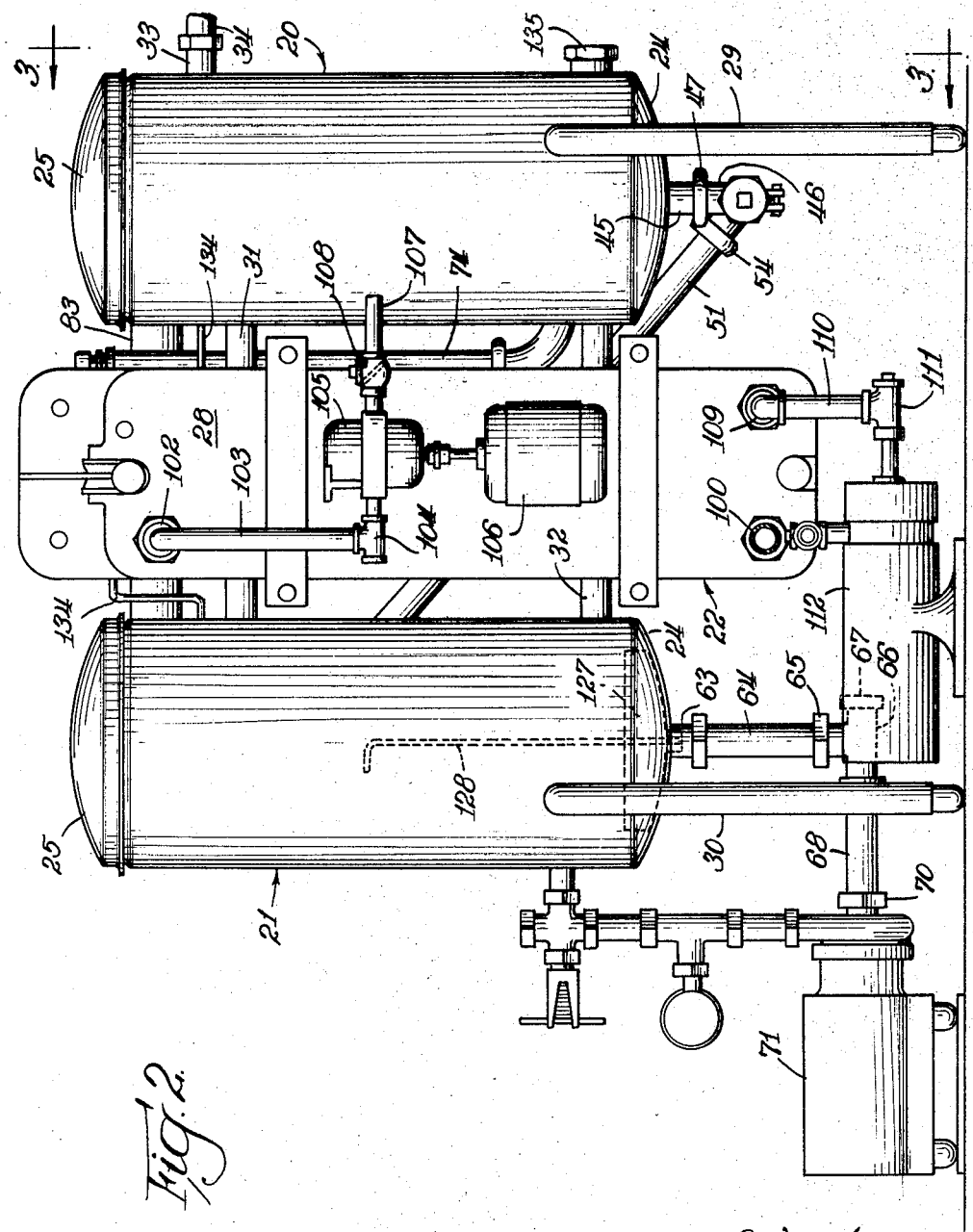

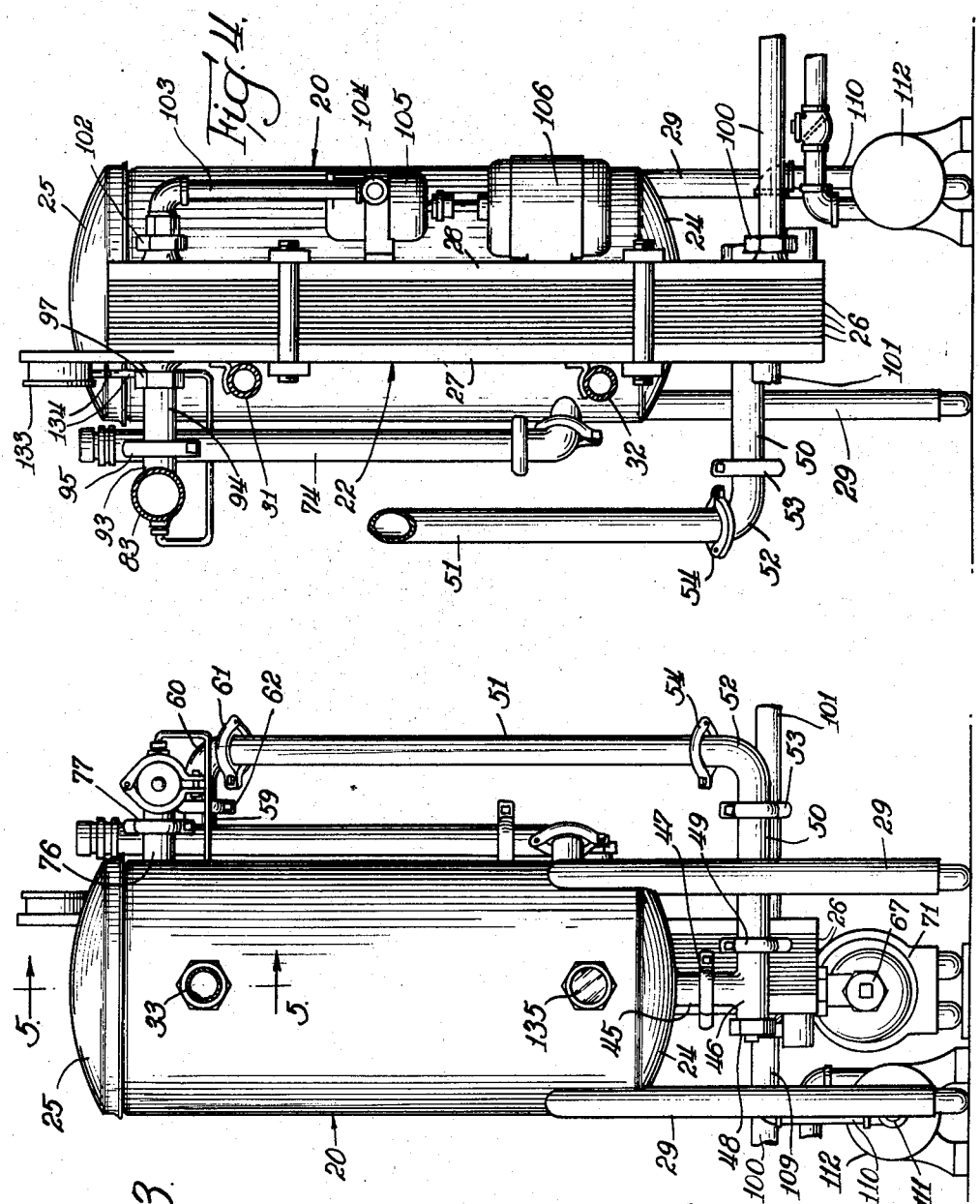

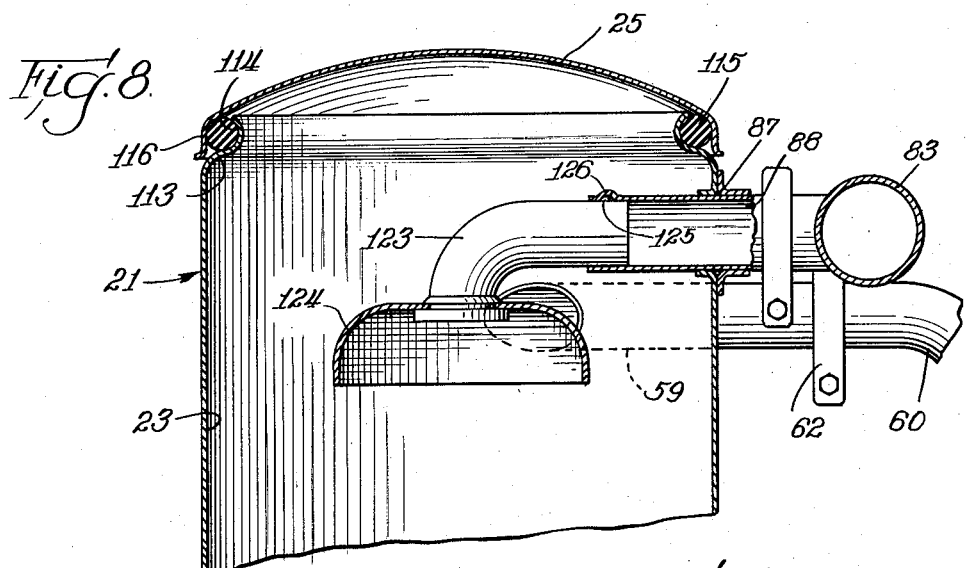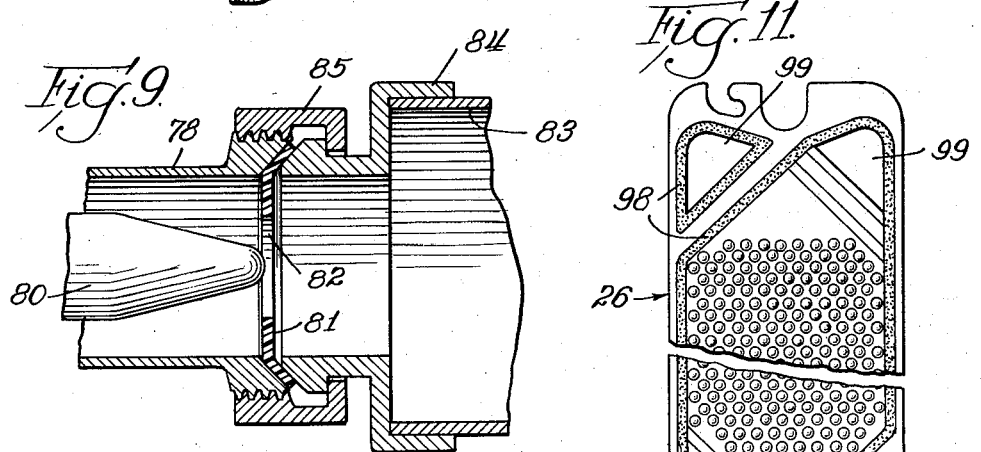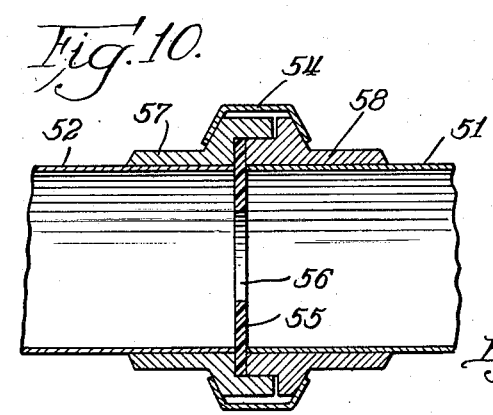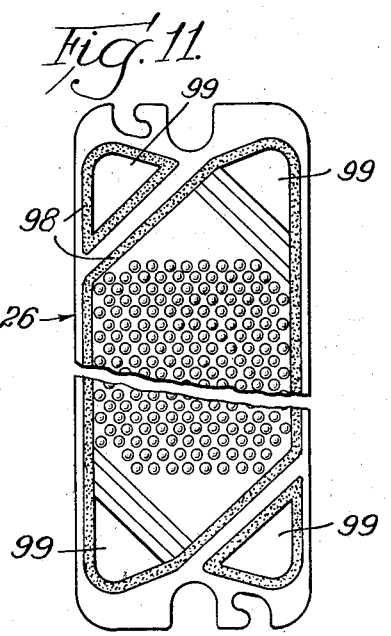

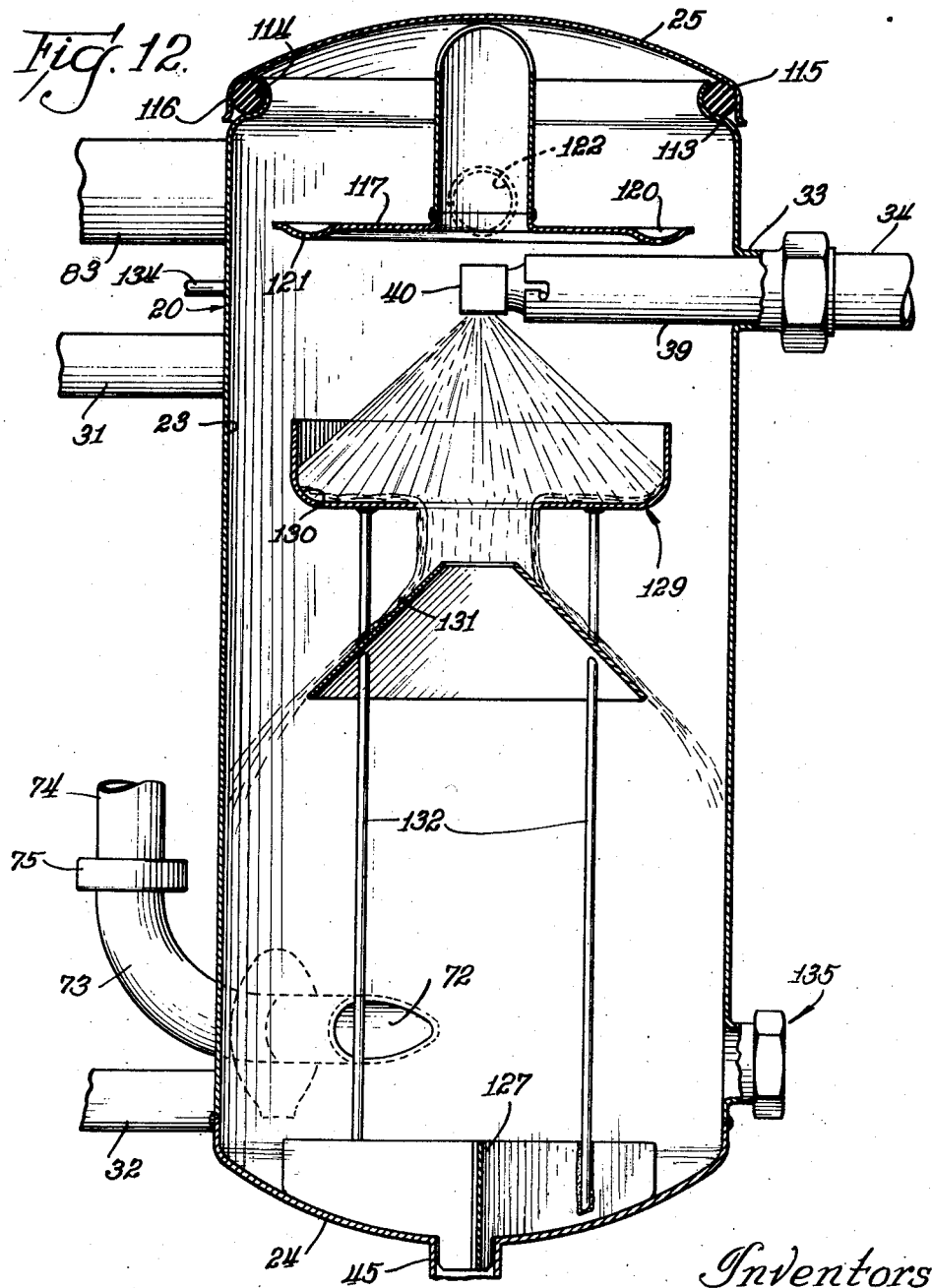

United States Patent Office 2,944,479
Patented July 12, 1960

2,944,479

VACUUM-STEAM PROCESSOR

John C. Walsh and William M. Haselton, Cedar Rapids, Iowa, assignors to Cherry-Burrell Corporation, Chicago, Ill., a corporation of Delaware Filed Oct. 25, 1956, Ser. No. 618,241

7 Claims. (Cl. 99—251)

Our invention relates to a vacuum-steam processor for potable liquids and has reference more particularly to an improved apparatus and method for commingling steam with the fluid product to be processed and for then removing the steam and volatile odor-producing materials therefrom in a zone of sub-atmospheric pressure.

A method of and facilities for pasteurizing and deodorizing lacteal fluids with steam under vacuum was disclosed in Patent No. 2,089,132 granted August 3, 1937, to H. L. Murray. An improved three chamber apparatus for this purpose was shown in the H. L. Murray Patent No. 2,314,455, issued March 23, 1943.

As is commonly known, fats have a high affinity for odors and this is particularly true of the butterfat found in milk. This causes a considerable problem in the dairy industry because butterfat is highly susceptible to flavor changes and objectionable odors. Many of these odors and flavor problems are attributable to cattle feed. For example, when cattle feed on pungent or aromatic weeds, or even on alfalfa and clover, a "weedy" or "pasture" flavor may be imparted to their milk. Even barn odors can be found in some milk. Consumers find these off flavors objectionable and they reduce their consumption of such milk products. Thus dairies have found it necessary in many parts of the country to condition their milk by removing these foreign flavors so as to maintain uniformity of flavor throughout the year and thus avoid loss of sales.

The most successful conditioning to remove these flavors and odors has been found to be steam and vacuum treatment of the type disclosed in the cited Murray patents.

It is a principal object of our invention to provide improved method and apparatus for steam-vacuum treatment of milk, cream, and other potable liquids which permits a wider range of treatment than heretofore available including "light" treatment where the foreign flavors are removable without severe processing.

It is another object of our invention to afford more versatile facilities for this purpose which will assure uniform and thorough steam incorporation in the liquid being treated.

It is a further object of our invention to design a single, compact unit which incorporates sanitary design features to enable convenient disassembly for cleaning and quick reassembly.

It is a still further object of our invention to provide an efficient and economical unit which requires a minimum of steam for operation, and which uses a minimum of water in the condenser and does not pollute that which is used, these and other objects being accomplished as hereinafter described, reference being had to the accompanying drawing in which Fig. 1 is a side view of a vacuum-steam processing unit embodying our invention;

Fig. 2 is a view of the opposite side of the unit;

Fig. 3 is an end view taken on the line 3—3 of Fig. 2;

Fig. 4 is a view on the line 4—4 of Fig. 1;

Fig. 5 is an enlarged view on the line 5—5 of Fig. 3;

Fig. 6 is a view on the line 6—6 of Fig. 5;

Fig. 7 is an enlarged view on the line 7—7 of Fig. 1;

Fig. 8 is a view on the line 8—8 of Fig. 1;

Fig. 9 is an enlarged view on the line 9—9 of Fig. 1;

Fig. 10 is an enlarged view on the line 10—10 of Fig. 1;

Fig. 11 is a partial view of a heat exchanger plate as used in the condenser of our vacuum-steam processor; and Fig. 12 is a sectional view corresponding to Fig. 5 but showing an optional form of baffle device adapted to be installed in a chamber of our vacuum-steam processor.

Referring now to the drawing, the vacuum-steam processor embodying our invention comprises a first chamber designated generally by the reference numeral 20, and adjoining second chamber 21, and a condenser 22.

In a preferred form the first chamber 20 and the second chamber 21 are substantially identical in form and size, each having relatively cylindrical side walls 23, each being disposed in an upright position and spaced apart substantially as shown in Fig. 1, and each having a dished bottom 24.

Each of the chambers 20 and 21 has a removable cover 25. The respective chambers 20 and 21 and the respective covers 25 are formed preferably of stainless steel or other non-corrosive, non-toxic metal, as are substantially all other product contacting surfaces and parts in our vacuum-steam processor.

We have found that in a processor adapted to handle approximately 10,000 pounds of product an hour, the respective chambers should have an inside diameter of about 16 inches and a height of about 36 inches, although it will be understood that our invention is not limited to a processor of certain specific dimensions. In fact, it is contemplated that this equipment may be built in varying sizes to handle varying capacities of product per hour.

The condenser 22 is preferably of the multiple plate heat exchanger type and comprises a plurality of such plates 26 compressed between a front terminal member 27 and a back terminal member 28. The first chamber 20 is provided with spaced, depending legs 29 at the side away from the condenser 22 and the second chamber 21 is likewise provided with depending legs 30 remote from the condenser 22, the two chambers 20 and 21 being supported laterally in spaced apart relation by an upper cross-bar 31 and a lower cross-bar 32, the condenser 22 being supported in said cross-bars 31 and 32. The respective legs 29 and 30 may be adjustable to permit convenient levelling of the processor when it is installed.

A product inlet duct 33 projects substantially radially outwardly from the first chamber 20 near the top thereof and remote from the condenser 22, the outer edge of the inlet duct 33 being externally threaded as shown in Fig. 5. A product supply pipe 34 is connected to said port 33 by means of a coupling 35.

The supply pipe 34 is connected at its other end to a valve 36 which may be of the double-acting air-bleed type shown in copending patent application Serial No. 281,113 filed April 3, 1952, by Arthur H. Boileau, Charles J. Rayman, and Francis S. Board, now Patent No. 2,772,693. The valve 36 is connected at its lower end to a pipe 37 which connects to a product infeed pump 38. It is desirable that the valve 36 bleed air trapped in the pipe 37 when the pump 38 is in operation before admitting product to the first chamber 20 and that the valve 36 seal instantly upon the dropping off of product pressure in the pipe 37 below a predetermined level.

A tube 39 is disposed in inlet duct 33 and projects radially inwardly into the chamber 20. A nozzle 40 is disposed at the inner end of the tube 39 and is positioned substantially axially within the chamber 20. The nozzle 40 is preferably of a type adapted to discharge liquid product in a relatively broad, hollow conical spray as indicated by the dotted lines in Fig. 5. The nozzle 40 may have a bayonet-type mounting for insertion in the inner end of the tube 39 and may be provided with a circumferential groove 41 in which an O-ring 42 is seated to provide a liquid seal between the body of the nozzle 40 and the tube 39. Likewise, the outer end of the tube 39 may be provided with a circumferential concavity 43 in which an O-ring 44 is seated to provide a seal at the juncture of the outer end of said tube 39 with the inlet duct 33 and the supply pipe 34.

A product discharge outlet 45 is provided centrally in the dished bottom 24 of the chamber 20 and a T 46 is connected to said outlet 45 by means of a clamp 47. At one side the T 46 is closed by means of a cap 48 and at the other side, the T 46 is connected by means of a suitable coupling 49 to a lateral duct 50 that extends substantially radially beyond the outer edge of the chamber 20 as shown in Figs. 3 and 4.

The duct 50 is connected to a diagonally upwardly disposed conduit 51 through an elbow 52, said elbow 52 being connected to the duct 50 by means of a clamp 53 and to the conduit 51 by means of a similar clamp 54 or other suitable means.

As shown sectionally in Fig. 10, a disc 55 with a throttling orifice 56 therein may be interposed between the elbow 52 and the conduit 51. A ferrule 57 on the elbow 52 engages a ferrule 58 on the conduit 51 and engages the throttling disc 55 therebetween, the respective ferrules being held in engagement by the clamp 54 which may be of the type commonly used with sanitary fittings in the dairy industry. Similar discs 55 with throttling orifices 56 of other sizes may be used to obtain greater or lesser throttling effect or in some instances, it may be preferable to substitute a throttling valve.

The second chamber 21 is provided near the top and at the side remote from the condenser 22 with a tangential inlet 59 adapted to communicate with the upper end of the diagonally disposed conduit 51. An elbow 60 is interposed between the tangential inlet 59 and the conduit 51 and is connected thereto by means of clamps 61 and 62 respectively.

The dished bottom 24 of the second chamber 21 is provided at its center with a discharge outlet 63 which is connected through an axial duct 64 and suitable clamps 65 with the side inlet of a T 66 which is closed at one end with a cap 67 and communicates at the other end with a lateral duct 68 by means of a clamp 69, said lateral duct being joined by a clamp 70 to the inlet side of a product discharge pump 71. The product discharge pump 71 is, preferably, of the sanitary type which may be disassembled readily for cleaning and in which the product contact surfaces are of stainless steel.

Steam is supplied to the first chamber 20 through a tangential inlet 72 disposed near the bottom of said first chamber 20, said tangential inlet 72 communicating through an elbow 73 with a steam supply pipe 74 with suitable clamps or couplings 75. The steam may pass through a steam separator, a pressure reducing valve, and a steam purifier (not shown) before being admitted to the inlet 72 to the first chamber 20.

Gas and vapor are withdrawn from the first chamber 20 through an outlet 76 which is connected by means of a suitable clamp 77 to the side inlet of a T 78 which is provided at one side with a vacuum control valve 79. The vacuum control valve 79 may be of any suitable type for opening, closing, or throttling the flow of gas or vapor from the first chamber 20 and may be provided with a reciprocable needle member 80 projecting through the T 78. Preferably, a throttling disc 81 with an orifice 82 therein is interposed between the T 78 and an exhaust header 83 as shown sectionally in Fig. 9, wherein the throttling disc 81 is engaged between the threaded end of the T 78 and a reducing ferrule 84 on the vapor header 83, the ferrule 84 and the end of the T 78 being held in engagement by a coupling 85. The needle member 80 projects toward the orifice 82 and is adjustable toward or away from the orifice 82 to throttle the opening by means of a handle 86 threadably mounted on the valve 79.

Similarly, chamber 21 is provided near its top with a radial outlet 87 through which an exhaust tube 88 projects. The tube 88 is connected to a lateral port on the exhaust header 83 by means of a clamp 89. At the adjacent end, the exhaust header 83 is provided with a vacuum relief valve 90 connected thereto by means of a coupling 91. The vacuum relief valve 90 has an air bleed petcock 92 as shown in Fig. 1.

The vacuum relief valve 90 is of any desired type and is adapted to admit air to the exhaust header 83 when the air pressure in the chamber 21 and the condenser 22 is below a predetermined number of inches of mercury.

The function of the air bleed petcock 92 is to open up the header 83 and thus to admit air to the system when the apparatus is shut down, such as for cleaning, so as to relieve the vacuum in chambers 20 and 21 and in the condenser 22.

The exhaust header 83 is provided with an outlet port 93 positioned as indicated by the dotted lines in Fig. 1 opposite the top of the condenser 22 and communicates therewith through a short length of pipe 94. The pipe 94 is connected with the outlet port 93 by means of a clamp 95 and with the inlet 96 on the front terminal member 27 of the condenser 22 by means of a coupling 97.

The condenser 22 is preferably of the type shown in B. G. Newhall Patent No. 2,619,329 granted November 25, 1952 and in his Patent No. 2,639,126 granted May 19, 1953, and utilizes plates of the type disclosed in C. B. Dalzell Patent No. 2,281,754 granted May 5, 1942. The plates 26, as shown in Fig. 11, are provided with a suitable arrangement of gaskets 98 to cause selected ports 99 to communicate across the facing surfaces of adjoining plates 26 and to seal other selected ports 99 therefrom. A flow path is provided for gas and vapor through every second space between the assembly of plates 26 and a separate flow path is provided for cold water through the alternate spaces. Cold water is introduced into the condenser 22 through an inlet 100 in the back terminal member 28 and is withdrawn from the condenser 22 through an outlet 101 in the front terminal member 27. The alternate spaces through which the cold water is circulated are connected in series. The spaces through which the gas and vapor pass are preferably connected in parallel across the top and across the bottom of the condenser 22 with a gas outlet 102 communicating therewith at the top of the back terminal member 28 and connected through a pipe 103 and a T 104 with a gas pump 105 driven by a motor 106. The gas pump 105 discharges through a pipeline 107 with a check valve 108 therein.

Water is condensed on the cold surfaces of the plates 26 as the gas and vapor from the chambers 20 and 21 come in contact with said plates 26 while following the flow path through the condenser 22, and tends to accumulate at the bottom of the condenser 22 where it is drawn off through an outlet 109 in the back terminal member 28. The outlet 109 is connected through a pipe 110 and a T 111 to a condensate pump 112 which is adapted to discharge through a suitable sewage connection.

The cylindrical sidewalls 23 of the respective chambers 20 and 21 are provided around their top edges with inturned shoulders 113 with outwardly facing concave seats 114 therearound. Each seat 114 is provided with a circumferential gasket 115 of resilient material such as neoprene. Each cover 25 for the respective chambers 20 and 21 has a downwardly depending peripheral skirt 116 adapted to fit snugly over the gasket 115 so as to compress the gasket 115 in sealing relation between the skirt 116 and the seat 114.

The first chamber 20 has a removable baffle pan 117 of slightly less diameter than the interior diameter of the chamber 20. Diametrically opposite sides of the pan 117 are flattened along parallel chords so that the pan 117 is narrow enough to be removable though the top of the chamber 20. Lugs 118 on the inside walls 23 of the chamber 20 support the pan 117 removably in a predetermined position over the nozzle 40 and under the vapor exhaust port 122 of the outlet 76.

At its center, the pan 117 is provided with an upstanding tubular extension 119 open at the bottom for communication with the interior of the chamber 20 and with a mitered opening at the top to permit communication with the space in the top of the chamber 20 over the baffle pan 117. Around its outer edge, the baffle pan 117 has a concave gutter 120 with spaced drain holes 121 therethrough. Thus milk or other product entrained with vapor drawn up through the baffle pan 117 toward the exhaust outlet 76 may collect on the pan 117 and drain back into the chamber 20 through the drain holes 121.

The exhaust tube 88 which projects from the exhaust header 83 through the outlet 87 into the second chamber 21, receives in its inner end a downwardly turned elbow 123 on which a bell 124 is mounted. The downwardly turned elbow 123 may be provided at its tube-engaging end with a protuberance 125 adapted to engage a seat 126 in the tube 88 to insure proper positioning and prevent accidental displacement of the bell 124.

In order to resist the tendency of liquid product to swirl around in the bottom of the chambers 20 and 21, a removable anti-swirl baffle 127 may be used and such a baffle, in a preferred form, comprises a combination of three substantially radially projecting fins secured to upstanding axial rod 128, such as by welding, as shown by the dotted lines in Fig. 2. The rod 128 may be used for inserting and withdrawing the anti-swirl baffle 127. The lower edges of the fins of the baffle 127 are carved to fit the interior contour of the dished bottom 24 so as to avoid flow spaces therebetween.

Where desired to obtain maximum processing effect in the first chamber, a supplemental liquid deflecting unit 129 as shown in Fig. 12 may be employed. The deflecting unit 129 comprises a circular pan 130 disposed under the spray nozzle 40 in the path of the spray as shown in Fig. 12. The pan 130 is provided with a central opening through which the spray of liquid product is permitted to drain out of the pan 130. Immediately therebelow a frusto-conical skirt 131 is provided to receive the liquid product discharged from the central opening of the pan 130 and to redirect the flow outwardly as indicated by the flow lines in Fig. 12 to strike the outer wall 23 of the chamber 20. The circular pan 130 and conical skirt 131 are mounted on legs 132 which may be secured by welding to the fins of the baffle 127 as shown in Fig. 7 and Fig. 12 so as to permit convenient insertion and removal of the deflecting unit 129 and the anti-swirl baffle 127 as a single assembly.

Vacuum pressure gauges 133 are provided on a panel above the front terminal 27 of the condenser 22. These are connected by means of tubes 134 to the T 78 and the exhaust header 83 opposite the respective vapor exhaust outlets of the respective chambers 20 and 21. Thus the gauges 133 serve to indicate the vacuum pressure in each of the chambers through measurement of the pressures at their respective vapor outlets.

Sight glasses 135 of any conventional type may be mounted in the sidewalls 23 of the respective chambers 20 and 21 to permit inspection of the liquid level and activity therein. The sight glasses 135 are preferably mounted near the bottoms of the respective chambers as shown in Figs. 1 and 3.

The operation of our vacuum-steam processing unit, and the method to be employed therewith, particularly with milk or other dairy products, are as follows:

The first step is to start the gas pump 105 and the condensate pump 112 so as to evacuate air from the chambers 20 and 21 through the condenser 22 and also to remove any condensed vapor or water as it collects at the bottom of the condenser 22.

The next step is to turn on the cold water supply to the condenser 22 through the inlet 100. Ordinarily this would be city water, tower water, or well water in a temperature range up to about 90° F. Since the water makes no contact with the vapor or steam as it passes through the condenser 22, it does not become contaminated and may be reused for other purposes or recirculated to the tower tank.

As soon as a vacuum of from 22 to 25 inches of mercury is obtained in the chambers 20 and 21, as shown on the vacuum gauges 133, or until the vacuum relief valve 90 operates, the steam line is turned on to supply steam through the steam supply pipe 74 and the tangential inlet 72 into the first chamber 20. A valve (not shown) on the steam line should be opened until the vacuum in the first chamber 20 drops to about the desired operating point, such as 15 inches of mercury, as shown on the gauge 133. During startup the vacuum control valve 79 is kept closed and is not opened until the system is in full operation. In some instances it may be desired to leave the vacuum control valve 79 closed during operation, depending on the intensity of the treatment to be given to the product being processed.

The flow of milk or other product to the first chamber 20 is started by turning on the infeed pump 38. During the initial operation the pump causes air trapped in the supply pipe 34 to be bled from the line through the valve 36. When the milk pressure in the supply pipe 34 is sufficient, the valve 36 admits the milk through the inlet duct 33 to the tube 39 where it is sprayed into the first chamber 20 through the nozzle 40. The introduction of the milk into the first chamber 20 should cause reduction of the vacuum in that chamber to approximately 10 inches of mercury.

In the first chamber 20 the steam commingles and condenses with the milk, thus heating the milk to a temperature in the approximate range of from 166° to 195° F. The milk and condensed steam flow in a thin film down the interior of the sidewalls 23 of the first chamber 20 and the steam in the chamber continues to act on the thin film of milk until it reaches the product discharge outlet 45 at the bottom of the chamber 20. Where greater steam treatment is desired, the liquid deflecting unit 129, as shown in Fig. 12, is installed in the first chamber 20 so as to cause increased exposure of the milk flow to the action of the steam.

The vacuum control valve 79 may be opened to permit withdrawal of steam and vapor from the first chamber 20. The adjustment of the vacuum control valve 79 will, of course, affect the vacuum level in the first chamber 20.

The milk and condensed steam flow through the diagonal conduit 51 to the second chamber 21, the flow through said diagonal conduit 51 being retarded by the throttling orifice 56, thus enabling the maintenance of a vacuum differential in the respective chambers 20 and 21.

The milk is introduced tangentially into the second chamber through the tangential inlet 59 at the top thereof where it is caused to flow in a thin spiral film down the interior of the sidewalls 23 of the second chamber 21. The lower pressure in the second chamber 21, preferably in the range of from 22 to 25 inches Hg, lowers the boiling point of the mixture and causes evaporation of the condensed steam, thus removing it in vapor form along with odor and flavor-causing volatiles in the milk. The vapors thus removed are withdrawn from the second chamber 21 through the bell 124 and the elbow 123 through the tube 88 and the outlet 87 to the exhaust header 83 where it passes to the condenser 22.

The increased vacuum in the second chamber 21 causes a temperature drop in that chamber to the approximate range of 134° to 152° F.

Temperature may be controlled by admitting more or less steam to the first chamber 20 and also by regulating the vacuum control valve 79. Also where heavier steam treatment is required, such as to remove more difficult odors in the milk, more steam may be admitted to the first chamber 20 and the vacuum control valve 79 should be opened further.

Milk is ordinarily supplied to our vacuum-steam processing unit from a so-called short-time pasteurizer of the type commonly used in dairies where the milk is heated to a temperature of approximately 164° F. Where milk or other products to be processed do not come directly from a pasteurizer, they should be preheated to approximately that temperature so as to enable the steam to raise the temperature of the product to the range of 166° to 195° F., as previously described.

By taking the milk out of the system at approximately 10° or more below the temperature in which it is introduced, removal of all steam condensed with the milk during processing is assured and the milk discharges through the discharge outlet 63 of the second chamber 21 as it was supplied to the chamber 20 or with very slightly reduced moisture content.

The milk or other product that has been processed in our device is withdrawn from the second chamber 21 by the product discharge pump 71 through which it is pumped to suitable storage vats or elsewhere for bottling or other use.

The uncondensed vapor withdrawn from the condenser 22 by the gas pump 105 may be discharged to the atmosphere.

The condensate withdrawn from the condensate pump 112 should be discharged to the sewer since this will be fouled by odors and flavors extracted from the milk or other product.

In some instances, such as in the processing of orange juice where it is desired to distill and remove peel oil from the juice, the condense may pass from the condensate pump 112 to a separator or other means for removing entrained peel oil.

It will be understood that the general function of our vacuum-steam processing unit is to remove by volatilization or distillation matter contained in potable liquids which is objectionable for one reason or another and the unit may be coupled with any of a variety of pieces of processing equipment and the temperatures and pressures within the chambers 20 and 21 may be varied within broad ranges to modify the processing effect as desired.

While we have shown and described our invention in a preferred form, we are aware that it can be modified in many ways without departing from the spirit of our invention, the scope of which is to be determined by the appended claims.

We claim:

1. In a processor of the class described, the combination of a condenser, a first upright vacuum processing chamber at one side thereof, a second upright vacuum processing chamber adjacent thereto, a communicating duct connected to the bottom of the first chamber and leading tangentially into the upper portion of the second chamber, a product supply duct leading into the upper part of the first chamber and having means at the inner end thereof to spray product downwardly in a relatively cone-like pattern, a source of steam communicating relatively tangentially with the lower part of the first chamber, a product discharge duct communicating with the bottom of the second chamber, a pump connected to said discharge duct for removing product from the second chamber, a gas exhaust duct communicating with the second chamber and the condenser, pump means connected to said condenser remote from said exhaust duct to withdraw vapor from the second chamber through the condenser, and means in said exhaust duct for controlling the vacuum in said second chamber independently of said condenser and said first chamber.

2. A processor of the class described, comprising a first upright vacuum chamber, a second upright vacuum chamber, a condenser disposed therebetween, a duct having one end connected to the bottom of the first chamber and the other end communicating relatively tangentially with the upper part of the second chamber, a product supply duct with product pressure responsive valve means therein leading into the upper part of the first chamber and adapted to spray product conically therefrom, a steam duct communicating tangentially with the lower portion of the first chamber, a discharge duct connected to the bottom of the second chamber, an exhaust duct connected at its respective ends to the respective chambers and connected therebetween to said condenser, a gas pump connected to said condenser to discharge gas passing from said exhaust duct through said condenser, a condensate pump connected to said condenser to withdraw liquid condensed from gas passing through said condenser, and means in said exhaust duct for controlling the vacuum in said second chamber independently of said condenser and said first chamber.

3. A processor of the class described, comprising a first upright vacuum chamber, a second upright vacuum chamber, a condenser disposed therebetween, a duct having one end connected to the bottom of the first chamber and the other end communicating relatively tangentially with the upper part of the second chamber, a product supply duct with valve means therein leading into the upper part of the first chamber and adapted to spray product conically therefrom, a steam duct communicating tangentially with the lower portion of the first chamber, a discharge duct connected to the bottom of the second chamber, an exhaust duct connected at its respective ends to the respective chambers and connected therebetween to said condenser, a gas pump connected to the upper part of said condenser to discharge gas passing from said exhaust duct through said condenser, and a condensate pump connected to the lower part of said condenser to withdraw liquid condensed from gas passing through said condenser, said exhaust duct being provided with means for adjustably throttling the exhaust of gas from one of said chambers.

4. A processor of the class described, comprising a first upright chamber, a second upright chamber, a condenser disposed therebetween, a straight-line duct having one end connected to the bottom of the first chamber and the other end communicating relatively tangentially with the upper part of the second chamber, a product supply duct with valve means therein leading into the upper part of the first chamber and adapted to spray product conically therefrom, a steam duct communicating tangentially with the lower portion of the first chamber, a discharge duct connected to the bottom of the second chamber, an exhaust duct connected at its respective ends to the respective chambers and connected therebetween to said condenser, a gas pump connected to the upper part of said condenser to discharge gas passing from said exhaust duct through said condenser, and a condensate pump connected to the lower part of said condenser to withdraw liquid condensed from gas passing through said condenser, said straight-line duct between the respective chambers being provided with a flow restricting orifice plate therein whereby the product flowing through said duct is rapidly accelerated.

5. A processor of the class described, comprising a first upright vacuum chamber, a second upright vacuum chamber, a plate-type condenser disposed therebetween, a duct having one end connected to the bottom of the first chamber and the other end communicating relatively tangentially with the upper part of the second chamber, a product supply duct with valve means therein leading into the upper part of the first chamber and adapted to spray product conically therefrom, a steam duct communicating tangentially with the lower portion of the first chamber, a discharge duct connected to the bottom of the second chamber, an exhaust duct connected at its respective ends to the respective chambers and connected therebetween to said condenser, a gas pump connected to the upper part of said condenser to discharge gas passing from said exhaust duct through said condenser, a condensate pump connected to the lower part of said condenser to withdraw liquid condensed from gas passing through said condenser, said first chamber having a removable baffle interposed in the path of the product spray to deflect and redirect the flow of product within said chamber, and means in said exhaust duct for controlling the vacuum in said second chamber independently of said condenser and said first chamber.

6. A processor of the class described comprising a first upright vacuum chamber, a second upright vacuum chamber, a vertically disposed plate-type condenser adjacent said chambers, a duct connected at one end to the bottom of the first chamber and at the other end to the upper part of the second chamber, a product supply duct with product-operated valve means therein leading into the upper part of the first chamber and adapted to discharge product therefrom in a broad spray pattern, a steam supply duct communicating with the lower portion of the first chamber, a product discharge duct connected to the bottom of the second chamber and having means for withdrawing product therefrom, an exhaust duct connected to said chambers and communicating with said condenser, a gas withdrawal pump connected to the upper portion of said condenser remote from said exhaust duct, a condensate pump connected to the lower portion of said condenser remote from said exhaust duct, and means in said exhaust duct for adjusting the relative vacuum in the respective chambers.

7. A processor of the class described comprising a first upright vacuum chamber, a second upright vacuum chamber, a vertically disposed plate-type condenser adjacent said chambers, a duct connected at one end to the bottom of the first chamber and at the other end to the upper part of the second chamber, a product supply duct with product-operated valve means therein leading into the upper part of the first chamber and adapted to discharge product therefrom in a broad spray pattern, a steam supply duct communicating with the lower portion of the first chamber, a product discharge duct connected to the bottom of the second chamber and having means for withdrawing product therefrom, an exhaust duct connected to said chambers and communicating with said condenser, a gas withdrawal pump connected to the upper portion of said condenser remote from said exhaust duct and a condensate pump connected to the lower portion of said condenser remote from said exhaust duct, said exhaust duct being provided with means for throttling communication with one of said chambers.

References Cited in the file of this patent
UNITED STATES PATENTS

| | | |
|---|---|---|
| 2,019,491 | Grinrod | Nov. 5, 1935 |
| 2,041,059 | French | May 19, 1936 |
| 2,452,260 | Peebles | Oct. 26, 1948 |
| 2,644,758 | Cross | July 7, 1953 |
| 2,665,628 | Boileau et al. | Jan. 12, 1954 |
| 2,732,308 | Laguilharre | Jan. 24, 1956 |